(12) United States Patent
Doi et al.

(10) Patent No.: US 6,247,561 B1
(45) Date of Patent: Jun. 19, 2001

(54) DISK BRAKE

(75) Inventors: Kazuhiro Doi; Tadashi Tamasho; Tsutomu Hamabe, all of Kanagawa-ken; Hideaki Ishii; Takahiro Tokunaga, both of Yamanashi-ken, all of (JP)

(73) Assignee: Tokico, Ltd., Kanagawa-ken (JP)

( * ) Notice: Subject to any disclaimer, the term of this patent is extended or adjusted under 35 U.S.C. 154(b) by 0 days.

(21) Appl. No.: 09/362,241

(22) Filed: Jul. 28, 1999

(30) Foreign Application Priority Data

Jul. 29, 1998 (JP) .................................................. 10-228661

(51) Int. Cl.[7] .................................................. F16D 65/38
(52) U.S. Cl. ..................................... 188/73.39; 188/73.45
(58) Field of Search ............................... 188/73.39, 73.44, 188/73.45, 73.1, 73.31, 71.1, 71.3, 72.1, 72.4, 72.5

(56) References Cited

U.S. PATENT DOCUMENTS

| | | | |
|---|---|---|---|
| 4,878,564 | * 11/1989 | Kondo | 188/73.31 |
| 5,178,236 | * 1/1993 | Terashima | 188/73.45 |
| 5,259,484 | * 11/1993 | Idesawa et al. | 188/73.45 |
| 5,975,252 | * 11/1999 | Suzuki et al. | 188/73.1 |

* cited by examiner

Primary Examiner—Robert J. Oberleitner
Assistant Examiner—Pamela J. Rodriguez
(74) Attorney, Agent, or Firm—Wenderoth, Lind & Ponack, L.L.P.

(57) ABSTRACT

In the disk brake, mounting portions of the caliper of a disk brake extending toward the entrance side and the exit side with respect to the rotation direction of the disk. Relative to the rotation direction, the length of the mounting portion on the entrance side is greater than that of the mounting portion on the exit side so that the cylinder portion is offset toward the exit side. Further, the mounting portion on the entrance side has thickenings formed to extend in a longitudinal direction thereof, so that with respect to the direction of the axis of the disk, the thickness of the mounting portion on the entrance side is greater than that of the mounting portion on the exit side. During braking, when a bending moment acts on the caliper, which can cause inclination of the caliper relative to the disk, flexural rigidity of the mounting portion on the entrance side is higher than that of the mounting portion on the exit side.

10 Claims, 7 Drawing Sheets

DISK BRAKE

BACKGROUND OF THE INVENTION

The present invention relates to a disk brake which is advantageously used for applying a braking force to, for example, a vehicle.

A disk brake generally comprises a carrier which includes a connecting portion fixedly mounted on a non-rotational portion of a vehicle body and a pair of arms extending from the connecting portion across a disk so as to be spaced apart from each other in a circumferential direction of the disk. A caliper is supported by the carrier so as to be movable along the axis of the disk.

The caliper comprises a cylinder portion having a bore for receiving a piston for braking, a bridging portion extending from the cylinder portion across the disk and a claw portion extending from the bridging portion toward the center of the disk. The caliper further comprises two mounting portions for securing pins which are slidably supported in the arms of the carrier.

During braking, the bridging portion of the caliper receives a bending moment. Therefore, a problem arises, that a brake pad at an inner side of the disk, which is in contact with the disk during braking, receives high contact pressure at a portion thereof on the entrance side with respect to the rotation direction of the disk (on a side on which the disk enters the brake pad), leading to an increase in amount of wear at that portion of the pad. As a countermeasure for this problem, it has been known to offset the center of the cylinder portion from the center between the two mounting portions toward a side opposite to the entrance side, i.e., the exit side with respect to the rotation direction of the disk. By this arrangement, the above-mentioned problem is solved to a certain degree, but cannot be completely overcome. Thus, it has been desired to develop a further improved disk brake to avoid the above-mentioned problem.

SUMMARY OF THE INVENTION

According to the present invention, there is provided a disk brake comprising a carrier fixedly mounted on a non-rotational portion of a vehicle body a caliper slidably supported relative to the carrier by fitting a sliding pin provided in one of the carrier and the caliper into a guide bore formed in the other of the carrier and the caliper and a first friction member and a second friction member disposed at axially opposite sides of a disk. The first friction member is adapted to press one side of the disk according to a motion of a piston provided in the caliper, and the second friction member is adapted to press the second friction member against the other side of the disk according to a sliding motion of the caliper relative to the carrier which occurs when the piston presses the first friction member. The caliper comprises a cylinder portion, disposed at one side of the disk, having a cylinder bore, the piston being slidably provided in the cylinder bore a bridging portion extending across an outer periphery of the disk along the axis of the disk and a claw portion connected to the cylinder portion through the bridging portion and disposed at the other side of the disk to press the second friction member. The caliper further comprises a first mounting portion extending from the cylinder portion toward an entrance side with respect to a rotation direction of the disk and a second mounting portion extending from the cylinder portion toward an exit side with respect to the rotation direction of the disk. Each of the first and second mounting portions has a distal end portion connected to the carrier through the sliding pin.

A characteristic feature of the present invention resides in that the first and second mounting portions are formed such that, relative to the rotation direction of the disk, a length of the first mounting portion is greater than a length of the second mounting portion so that the center of the cylinder bore is offset relative to the disk toward the exit side, and such that, with respect to a direction of the axis of the disk, flexural rigidity of the first mounting portion is higher than flexural rigidity of the second mounting portion.

DETAILED DESCRIPTION OF THE INVENTION

Before explaining an embodiment of the present invention, for easy understanding of the present invention, explanation is made of a disk brake which is considered as the closest prior art with respect to the present invention, referring to FIGS. 6 to 9.

Figure 6:
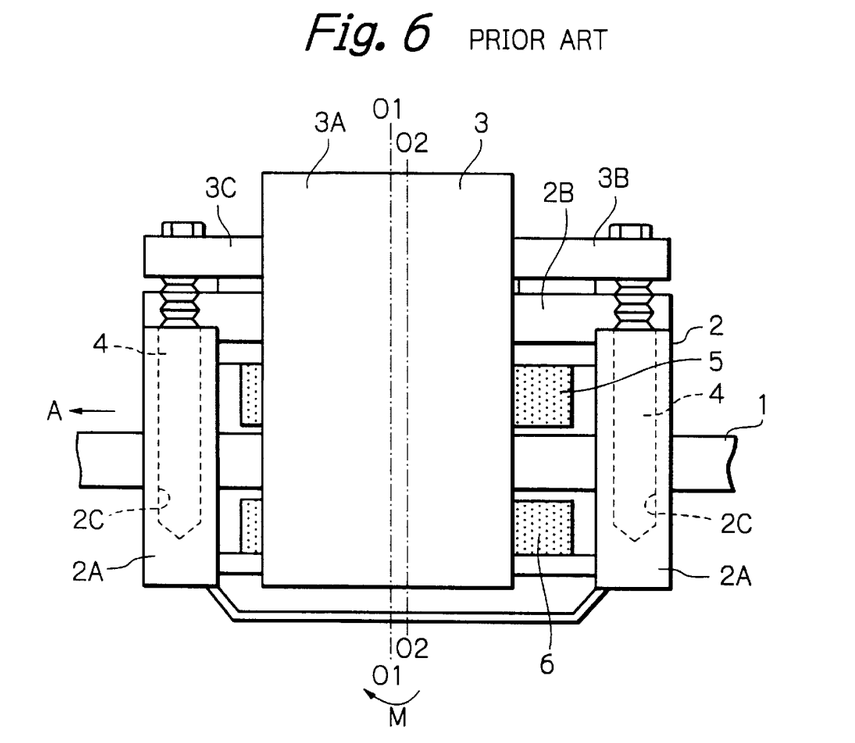
FIG. 6 is a front view of a conventional disk brake.
Figure 7:
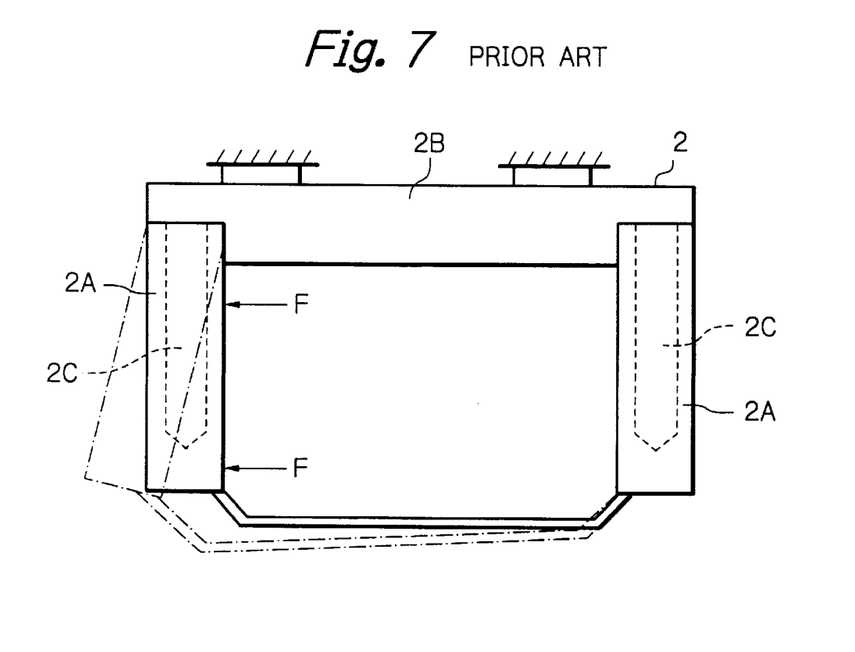
FIG. 7 is an explanatory view showing how a carrier in FIG. 6 is deformed during braking.

In FIGS. 6 through 9, reference numeral 1 denotes a disk which rotates, together with a vehicle wheel, in a direction indicated by an arrow A (hereinafter, frequently referred to simply as "the rotation direction A") in FIG. 6. Reference numeral 2 denotes a carrier provided at an inner side of the disk 1. The carrier 2 mainly comprises a pair of arms 2A extending along the axis of the disk so as to be spaced apart from each other in the rotation direction A and a connecting portion 2B connecting proximal end portions of the arms 2A. Each arm 2A has a pin hole 2C formed therein. The connecting portion 2B is connected integrally to a non-rotational portion of a vehicle body, as shown in FIG. 7.

Reference numeral 3 denotes a caliper supported so as to be slidable relative to the carrier 2 along the axis of the disk 1. The caliper 3 mainly comprises a caliper body 3A and mounting portions 3B and 3C. The caliper body 3A includes a cylinder bore (not shown) provided at the inner side of the disk 1. The cylinder bore is adapted to receive a piston. The caliper body 3A further includes a claw portion (not shown) provided at an outer side of the disk 1 for engagement with a friction pad 6 described later. The mounting portions 3B and 3C, respectively, extend from the caliper body 3A toward the entrance side and the exit side with respect to the rotation direction A.

With respect to the mounting portions 3B and 3C of the caliper 3, it should be noted that relative to the rotation direction A, the length of the mounting portion 3B provided on the entrance side with respect to the rotation direction A is greater than that of the mounting portion 3C provided on the exit side with respect to the rotation direction A. Thus, the center line O1—O1 of the cylinder bore of the caliper body 3A is offset from the center line O2—O2 between the mounting portions 3B and 3C toward the exit side with respect to the rotation direction A.

Figure 8:
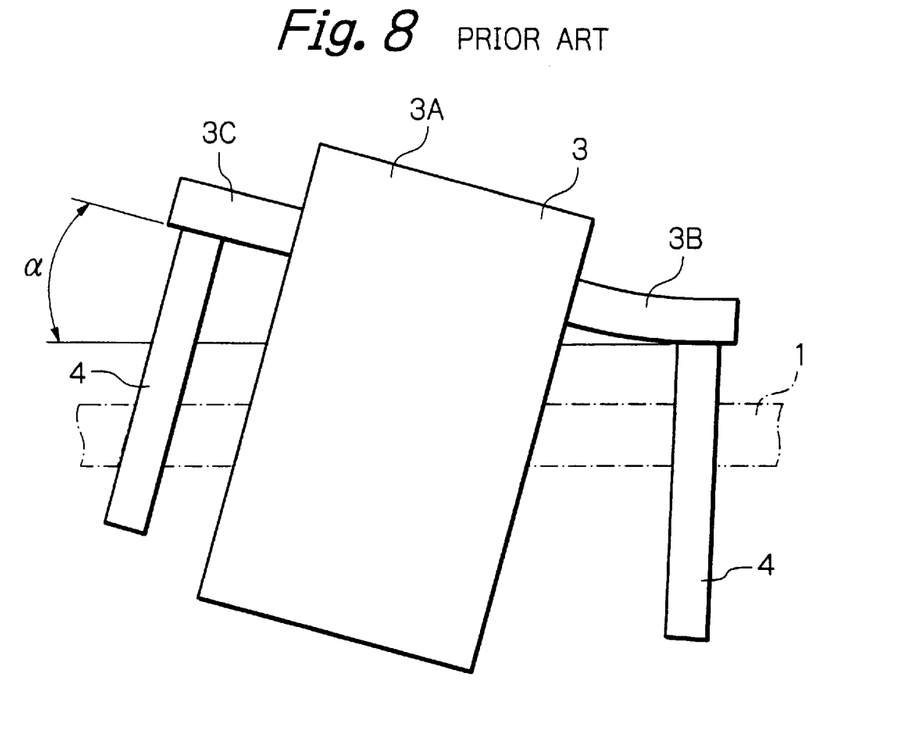
FIG. 8 is an explanatory view showing how a caliper in FIG. 6 is deformed during braking.

Each of the mounting portions 3B and 3C of the caliper 3 has a sliding pin 4 (FIG. 8). The sliding pins 4 are slidably provided in the pin holes 2C of the arms 2A of the carrier 2.

Reference numeral 5 denotes a friction pad provided at the inner side of the disk 1 and is capable of slidably moving relative to the arms 2A of the carrier 2 along the axis of the disk 1. The friction pad 6 is provided at the outer side of the disk 1 and is capable of slidably moving, like the friction pad 5, relative to the arms 2A.

In a conventional disk brake of the above-mentioned type, during braking, the piston slidably moves within the cylinder bore of the caliper 3 toward the disk 1 under externally applied fluid pressure, to thereby press the inner friction pad 5 against the disk 1. In this instance, the caliper 3 receives a reaction force from the disk 1 and moves toward the inner side of the disk 1, so that the claw portion of the caliper body 3A presses the outer friction pad 6 against the disk 1. Thus, a braking force is applied to the disk 1.

With respect to the arms 2A of the carrier 2, during braking, a braking torque is transmitted from the disk 1 through the friction pads 5 and 6 to the arm 2A provided on the exit side with respect to the rotation direction A. This braking torque acts in a direction indicated by arrows F in FIG. 7, so that the arm 2A on the exit side suffers elastic deformation such as indicated by a dot-and-chain line in FIG. 7, it is inclined relative to the connecting portion 2B fixedly mounted on the non-rotational portion of the vehicle body.

Consequently, the caliper 3, which is connected to the carrier 2 by means of the sliding pins 4, receives the above-mentioned braking torque from the disk 1 as a bending moment, which causes elastic deformation of the caliper 3 in a direction indicated by an arrow M (hereinafter, frequently referred to simply as "the direction M") in FIG. 6. Therefore, when the friction pads 5 and 6 are pressed against the disk 1, the surface pressure acting on the inner friction pad 5 in contact with the disk 1 is likely to be high on the entrance side with respect to the rotation direction A and is likely to be low on the exit side with respect to the rotation direction A.

In this conventional technique, in order to suppress non-uniform wearing of the friction pad 5, the center of the cylinder bore of the caliper body 3A is offset between the mounting portions 3B and 3C toward the exit side with respect to the rotation direction A, so as not to apply a high surface pressure to the friction pad 5 on the entrance side when it is in contact with the disk 1 during braking.

In the above-mentioned conventional disk brake, as mentioned above, the center of the cylinder bore of the caliper body 3A is offset between the mounting portions 3B and 3C, in order to suppress non-uniform wearing of the friction pad 5. Actually, however, it is very difficult to suppress non-uniform wearing of both the inner friction pad 5 and the outer friction pad 6 to a satisfactory level, as explained below.

In the above-mentioned conventional disk brake, the length (relative to the rotation direction A) of the mounting portion 3B provided on the entrance side with respect to the rotation direction A is made longer than that of the mounting portion 3C provided on the exit side with respect to the rotation direction A. Therefore, when the bending moment acts on the caliper 3 in the direction M in FIG. 6, rigidity of the mounting portion 3B relative to this bending moment is lower than that of the mounting portion 3C.

Consequently, during braking, the mounting portion 3B (provided on the entrance side with respect to the rotation direction A) suffers large elastic deformation as shown in FIG. 8, so that the caliper body 3A is inclined between the mounting portions 3B and 3C at an angle α of inclination relative to the disk 1.

In this state, during braking, the surface pressure acting on the inner friction pad 5 in contact with the disk 1 becomes high on the entrance side with respect to the rotation direction A and becomes low on the exit side with respect to the rotation direction A. On the other hand, the surface pressure acting on the outer friction pad 6 in contact with the disk 1 becomes low on the entrance side with respect to the rotation direction A and becomes high on the exit side with respect to the rotation direction A.

Figure 9:
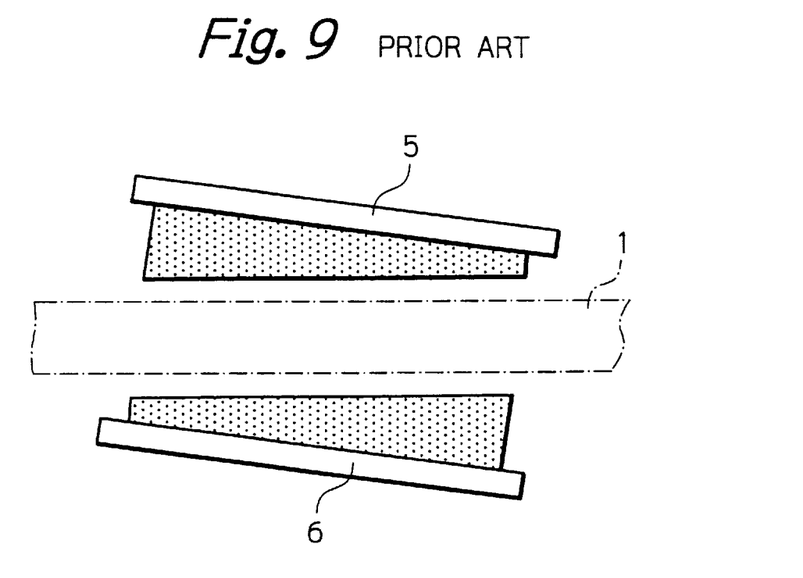
FIG. 9 is an explanatory view showing non-uniform wearing of friction pads in FIG. 6.

Thus, each of the friction pads 5 and 6 suffers non-uniform wearing as shown in FIG. 9, so that the life of the pads becomes undesirably short. Further, the non-uniform wearing of the friction pads 5 and 6 causes brake noise, and also causes dragging when the braking force has been released, leading to high fuel consumption.

In addition, the angle α of inclination of the caliper body 3A (cylinder bore) relative to the disk 1 varies, depending on the braking torque during braking of the disk 1, i.e., the magnitude of braking force. Therefore the surface pressure distribution with respect to contact surfaces of the disk 1 and the friction pad 5 markedly changes each time of braking, so that a stable braking force cannot be applied.

In view of the above, the present invention has been made. It is an object of the present invention to provide a disk brake which enables the caliper to stably press the friction pads against the disk with a uniform surface pressure distribution, thereby suppressing non-uniform wearing of the friction pads and enabling application of stable braking force.

Hereinbelow, description is made of a disk brake according to an embodiment of the present invention, referring to FIGS. 1 to 5.

Figure 1:
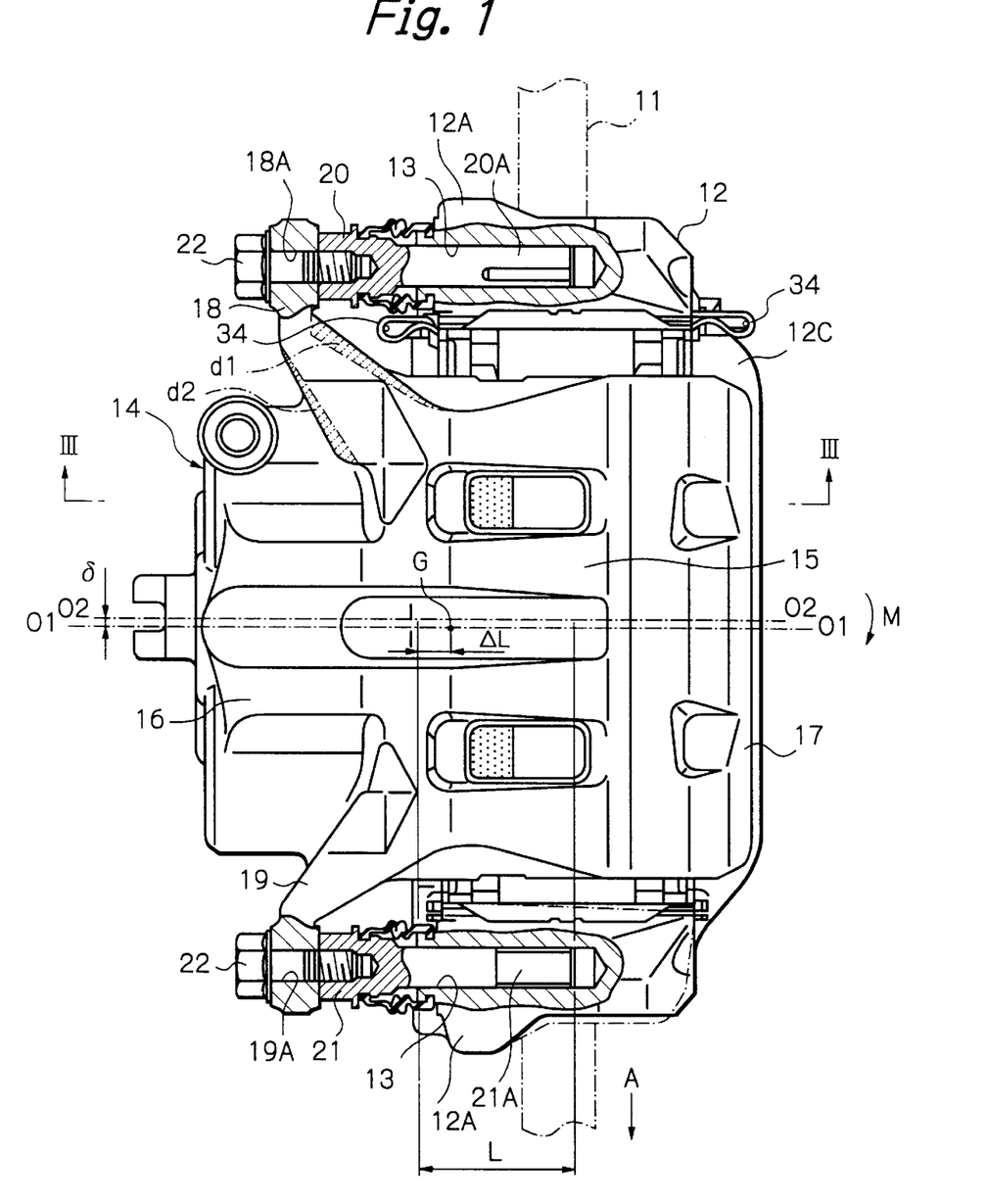
FIG. 1 is a front view of a disk brake according to an embodiment of the present invention.
Figure 2:
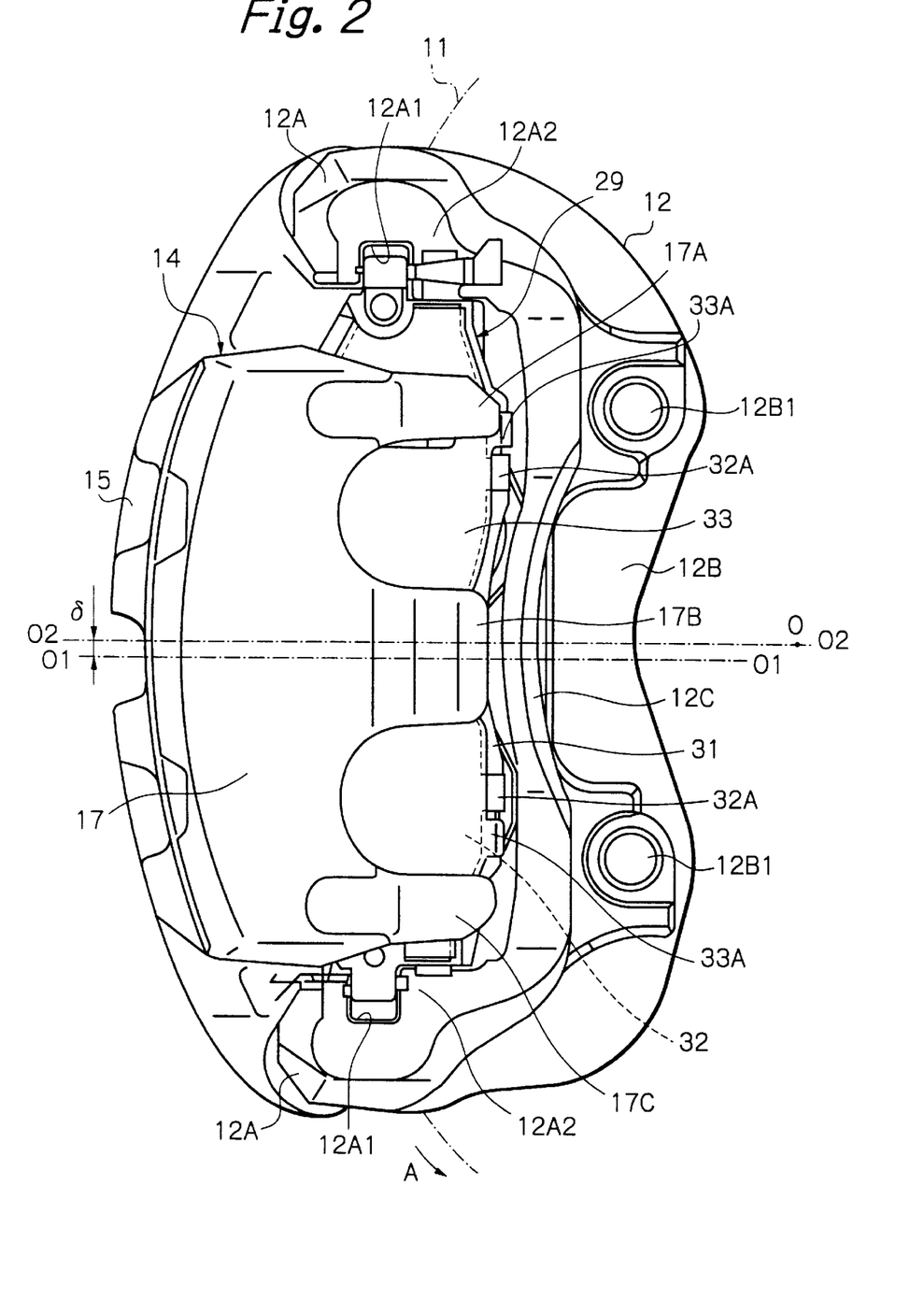
FIG. 2 is a side view of the disk brake as viewed from the right side of FIG. 1.

In FIGS. 1 through 5, reference numeral 11 denotes a disk which rotates, together with a vehicle wheel, in the direction indicated by the arrow A (the rotation direction A) in FIG. 1. Reference numeral 12 denotes a carrier which is fixedly mounted on a non-rotational portion of a vehicle body at an inner side of the disk 11. As shown in FIGS. 1 and 2, the carrier 12 mainly comprises a pair of arms 12A extending across an outer periphery of the disk 11 along the axis of the disk 11 so as to be spaced apart from each other in the rotation direction A and a connecting portion 12B (FIG. 2) connecting respective proximal end portions of the arms 12A.

As shown in FIG. 2, a narrow, reinforcing beam 12C is formed to extend in an arc form between the arms 12A and integrally connect respective distal end portions of the arms 12A. The connecting portion 12B of the carrier 12 has a pair of threaded holes 12B1 formed therein to be connected to the non-rotational portion of the vehicle body, such as a knuckle portion (not shown).

It should be noted that the carrier 12 is mounted on the vehicle body on the front side of the center O of rotation of the disk 11 (i.e., the axis of the vehicle wheel). Thus, the arm 12A provided on the entrance side with respect to the rotation direction A is disposed above the arm 12A provided on the exit side with respect to the rotation direction A.

Each arm 12A has a pin hole 13. The pin holes 13 of the arms 12A serve as guide holes for a pair of sliding pins 20 and 21 described later. Each pin hole 13 has a generally circular cross-section and has one end closed, and extends along the axis of the disk 11. Each arm 12A has pad guide portions 12A1 and torque-receiving portions 12A2 formed at the proximal end portion (at the inner side of the disk 11) and the distal end portion (at an outer side of the disk 11) thereof. Each pad guide portion 12A1 has a generally]-shaped (bracket-shaped) cross-section. Each torque-receiving portion 12A2 protrudes in a circumferential direction of the disk 11. (The pad guide portions 12A1 and the torque-receiving portions 12A2 formed at the outer side of the disk 11 are shown in FIG. 2.)

Backing plates 26 and 31 of friction pads 24 and 29 (described later in detail) are slidably engaged with the pad guide portions 12A1 of the arms 12A so that the friction pads 24 and 29 are slidably guided along the axis of the disk 11. The torque transmitted from the disk 11 through the friction pads 24 and 29 is received by the torque-receiving portions 12A2.

Reference numeral 14 denotes a caliper supported so as to be slidable relative to the carrier 12. The caliper 14 comprises a bridging portion 15 extending across the outer periphery of the disk 11 between the arms 12A of the carrier 12, a cylinder portion 16 having a cylinder bore 16A formed therein, which is disposed at one side (the inner side) of the disk 11 and connected to one side of the bridging portion, a claw portion 17 comprising claws 17A, 17B and 17C, which is disposed at the other side (the outer side) of the disk 11 so as to extend from the other side of the bridging portion 15 in a radially inward direction relative to the disk 11, and a pair of mounting portions 18 and 19 described later in detail.

Figure 4:
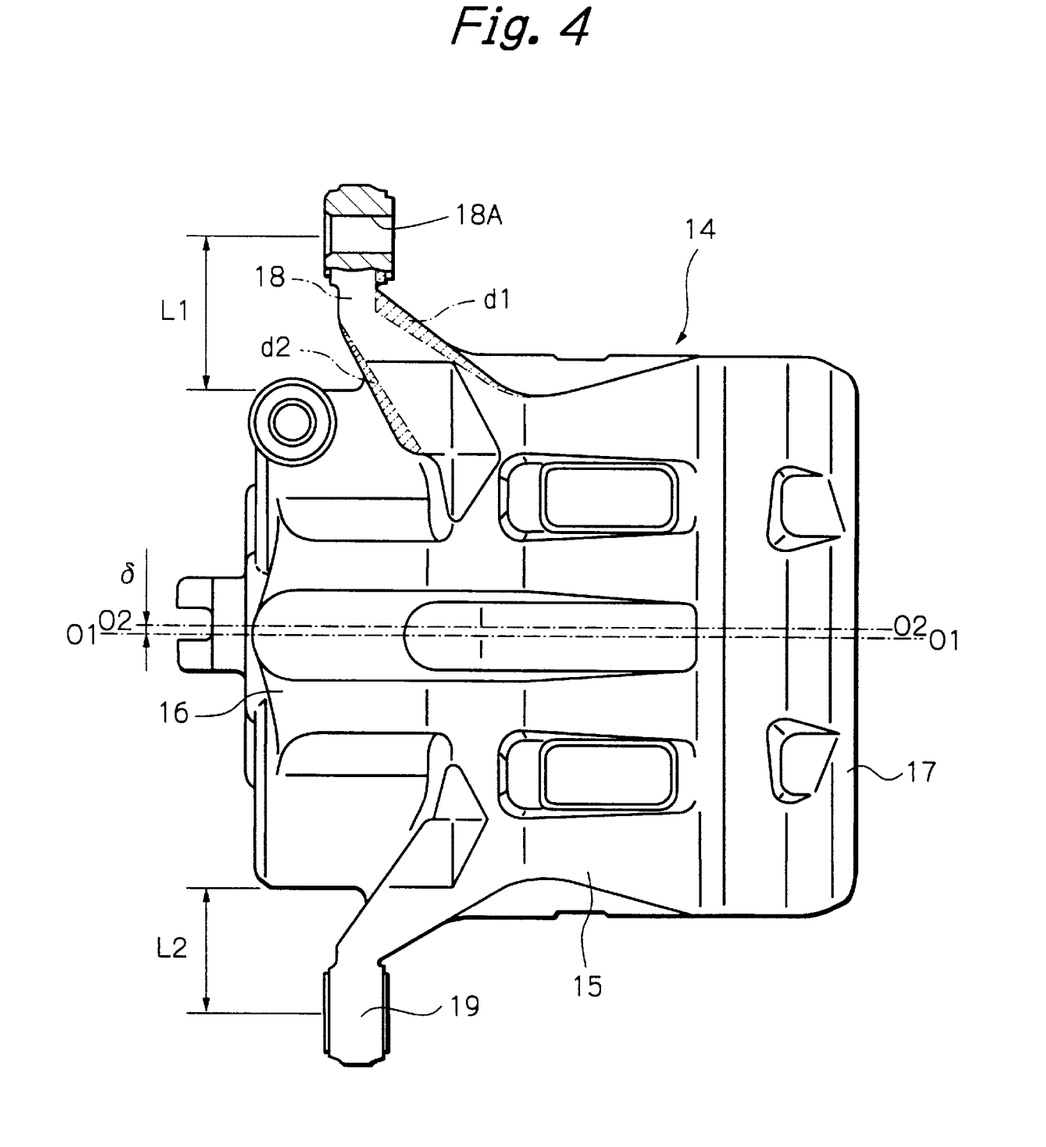
FIG. 4 is an enlarged front view of a caliper in FIG. 1 alone.
Figure 5:
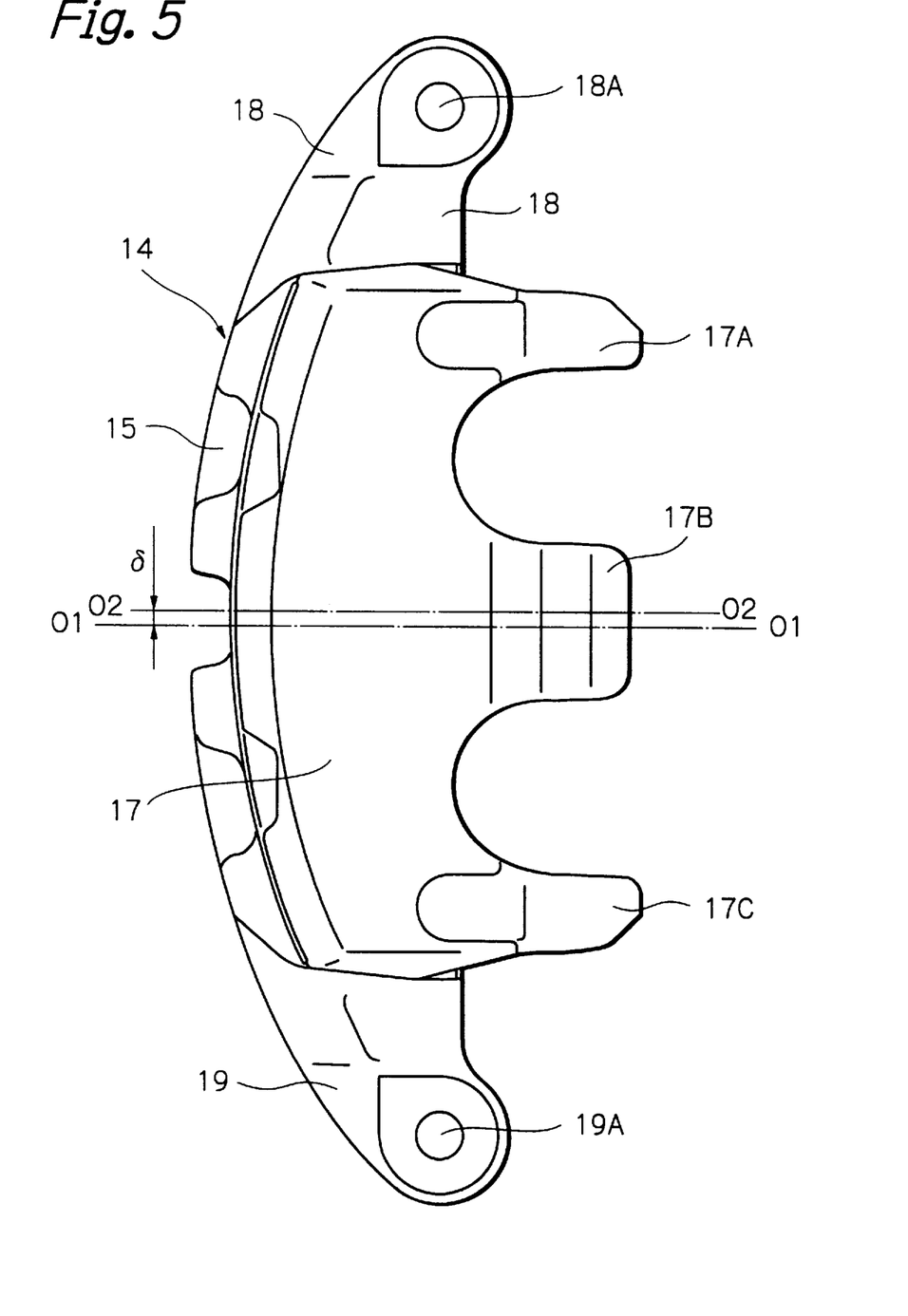
FIG. 5 is a side view of the caliper as viewed from the right side of FIG. 4.

As shown in FIGS. 1 and 4, the cylinder bore 16A of the caliper 14 is disposed such that a center line O1—O1 which passes through the center of the cylinder bore 16A is offset, by a distance δ, from a center line O2—O2 positioned at the center between the pin holes 13 of the carrier 12 toward the exit side with respect to the rotation direction A.

As shown in FIG. 1, the caliper 14 is arranged such that, at least when the braking force is released, the center G of gravity of the caliper 14 is positioned within a predetermined range relative to an axial direction of the disk 11. This predetermined range of the position of the center of gravity G of the caliper 14 is determined as a range of a fit length L which is set by means of the sliding pins 20 and 21 and the pin holes 13 of the arms 12A as explained later.

The position of the caliper 14, when the braking force is released, gradually shifts toward the inner side of the disk 11 according to wear of linings 25 and 30 of the friction pads 24 and 29. Therefore, the center of gravity G of the caliper 14 is previously offset from open ends of the pin holes 13 (the inner side of the above-mentioned fit length L) toward the outer side of the disk 11 by a length ΔL, which length corresponds to the maximum value of the amount of the above-mentioned shift of the position of the caliper 14. Thus, the center G of gravity of the caliper 14 is maintained at a position within the range of the fit length L, even when the friction pads 24 and 29 have been worn in a range of normal use (within effective wear tolerances predetermined by means of wear warning members 34).

The mounting portions 18 and 19 are provided in the caliper 14 so that the caliper 14 can be slidably mounted on the carrier 12. The mounting portion 18 extends from the cylinder portion 16 of the caliper 14 toward the entrance side with respect to the rotation direction A, and has a pin bolt hole 18A formed at a distal end portion thereof. The mounting portion 19 extends from the cylinder portion 16 toward the exit side with respect to the rotation direction A, and has a pin bolt hole 19A formed at a distal end portion thereof. The pin bolt holes 18A and 19A of the mounting portions 18 and 19 are integrally connected to the sliding pins 20 and 21, by means of pin bolts 22.

As shown in FIG. 4, an extension length L1 by which the mounting portion 18 (provided on the entrance side with respect to the rotation direction A) extends from the cylinder portion 16 in the circumferential direction of the disk 11 is greater than an extension length L2 by which the mounting portion 19 (provided on the exit side with respect to the rotation direction A) extends from the cylinder portion 16 in the circumferential direction of the disk 11 (L1>L2). Thus, as mentioned above, the center line O1—O1 of the cylinder bore 16A is offset, by the distance δ, relative to the disk 11 toward the exit side with respect to the rotation direction A.

It should be noted that as indicated by dot-and-chain lines in FIGS. 1 and 4, the mounting portion 18 (provided on the entrance side with respect to the rotation direction A) has thickenings d1 and d2 which are formed to extend in a longitudinal direction of the mounting portion 18. Thus, relative to the axial direction of the disk 11 the thickness of the mounting portion 18 is greater than that of the mounting portion 19, by an amount corresponding to the total thickness of the thickenings d1 and d2. Therefore, as described later, when a bending moment acts on the caliper 14 in the direction indicated by the arrow M in FIG. 1, flexural rigidity of the mounting portion 18 relative to this bending moment is higher than that of the mounting portion 19.

The sliding pins 20 and 21 are provided in the caliper 14. Proximal end portions of the sliding pins 20 and 21 are connected to the distal end portions of the mounting portions 18 and 19 by means of the pin bolts 22. Distal end portions of the sliding pins 20 and 21 are slidably fitted into the pin holes 13 of the arms 12A of the carrier 12. When the braking force is released, the sliding pins 20 and 21 fit within the pin holes 13 by the fit length L. Thus, the caliper 14 is mounted on the carrier 12 so as to be slidable along the axis of the disk 11 relative to the arms 12A.

Of the sliding pins 20 and 21, the sliding pin 20 is positioned above the sliding pin 21 when the carrier 12 is mounted on the vehicle body, and serves as a main pin for supporting the caliper 14. The distal end portion 20A of the sliding pin 20 has a diameter slightly larger than the diameter of the distal end portion 21A of the sliding pin 21 which serves as a sub pin.

Consequently, a relatively small gap is formed between the distal end portion 20A of the sliding pin 20 and the pin hole 13 of the arm 12A on the entrance side, while a relatively large gap is formed between the distal end portion 21A of the sliding pin 21 and the pin hole 13 of the arm 12A on the exit side.

Figure 3:
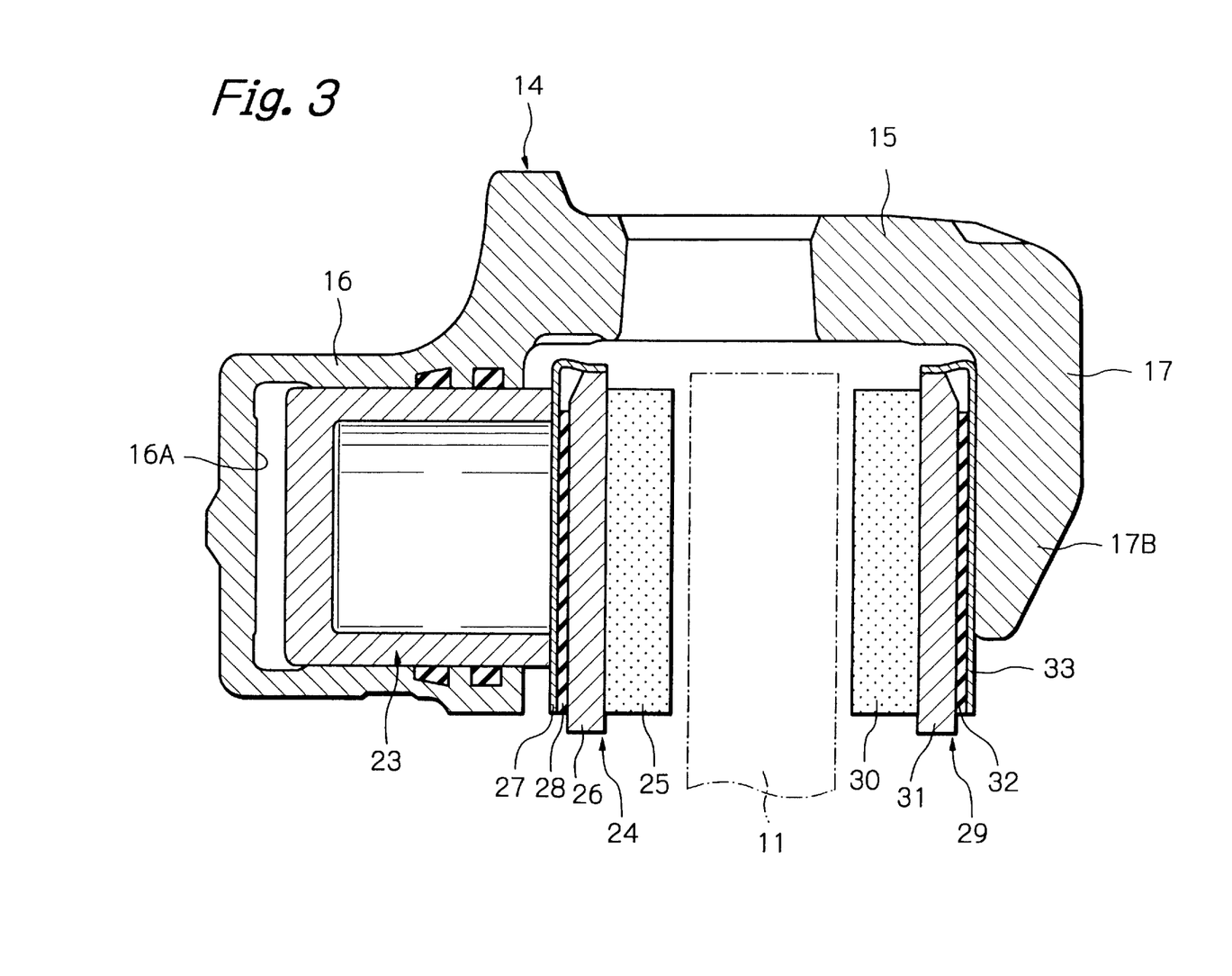
FIG. 3 is an enlarged cross-sectional view of the disk brake of FIG. 1, taken along the line III—III.

Reference numeral 23 denotes a piston slidably provided in the cylinder bore 16A of the caliper 14. As shown in FIG. 3, the piston 23 is in a form of a cylinder having one end closed. Due to the effect of the pressure of the brake fluid externally supplied into the cylinder bore 16A, the piston 23 slidably moves within the cylinder bore 16A in the axial direction of the disk 11 and enables opposite surfaces of the disk 11 to be pressed by the frictions pads 24 and 29 between the piston 23 and the claws 17A to 17C of the claw portion 17.

The friction pad 24 is provided at the inner side of the disk 11. As shown in FIGS. 2 and 3, the friction pad 24 comprises the lining 25 and the backing plate 26 fixed to and overlapping a rear surface of the lining 25. The backing plate 26 of the friction pad 24 has tab portions (not shown) protruding on longitudinally opposite ends thereof. The tab portions of the backing plate 26 are slidably supported by the pad guide portions 12A1 of the carrier 12 in the same manner as below-mentioned tab portions of the backing plate 31 so that the friction pad 24 can be pressed against the disk 11 by the caliper 14 to apply a braking force to the disk 11.

A shim plate 27 is attached to a rear surface of the backing plate 26 with a shim plate 28 being provided therebetween. The shim plate 27 comprises an anticorrosive metallic plate made of, for example, stainless steel. During braking, the surface pressure applied from the piston 23 to act on the friction pad 24 is equalized by the shim plate 27, thereby preventing deterioration of the shim plate 28. The shim plate 28 is coated with, for example, rubber, so as to suppress brake noise.

The friction pad 29 is provided at the outer side of the disk 11 and is arranged in substantially the same manner as the friction pad 24. The friction pad 29 comprises the lining 30 and the backing plate 31 provided on a rear surface of the lining 30. The backing plate 31 of the friction pad 29 has the tab portions protruding on longitudinally opposite ends thereof. The tab portions are slidably supported by the pad guide portions 12A1 of the carrier 12 so that the friction pad 29 can be pressed against the disk 11 by the caliper 14 so as to apply a braking force to the disk 11 between the friction pad 29 and the friction pad 24.

Reference numeral 32 denotes an inner shim plate provided on a rear surface of the backing plate 31. The inner shim plate 32 comprises, for example, a steel plate (not shown) having its opposite surfaces coated with a material which has a relatively high coefficient of friction and is softer than the backing plate 31, such as hard rubber. The inner shim plate 32 has fixing claw portions 32A as shown in FIG. 2. The fixing claw portions 32A are engaged with, for example, a peripheral edge of the backing plate 31 to be fixed to the rear surface of the backing plate 31, thus restricting relative displacement between the inner shim plate 32 and the friction pad 29.

Reference numeral 33 denotes an outer shim plate provided on a rear surface of the friction pad 29 with the inner shim plate 32 being provided therebetween. As shown in FIGS. 2 and 3, the outer shim plate 33 is shaped into a form substantially the same as that of the inner shim plate 32, by using an anticorrosive metallic plate made of, for example, stainless steel, and has its front surface abutting against the claws 17A to 17C of the claw portion 17 of the caliper 14.

A lubricant, such as grease, is supplied between the outer shim plate 33 and the inner shim plate 32 so that the coefficient of friction between the outer shim plate 33 and the inner shim plate 32 is lower than that between the outer shim plate 33 and the claws 17A to 17C. Consequently, the outer shim plate 33 is slidably in contact with the inner shim plate 32, thereby restricting relative displacement between the outer shim plate 33 and the claws 17A to 17C.

The outer shim plate 33 has guiding claw portions 33A. The guiding claw portions 33A are guided in the circumferential direction of the disk 11 relative to the backing plate 31 to slidably move relative to the inner shim plate 32.

The wear warning members 34 are provided in, for example, the tab portions of the friction pads 24 and 29. When the linings 25 and 30 of the friction pads 24 and 29 have been worn so as to exceed the effective wear tolerances and recessed to predetermined positions, the wear warning members 34 are brought into sliding contact with the disk 11 to generate noise, thereby enabling the driver to detect wearing of the frictions pads 24 and 29 so that the friction pads 24 and 29 are replaced with new friction pads.

The disk brake of the present invention is arranged as described above. Basic operation of the disk brake of the present invention is substantially the same as that of the conventional disk brake. In the disk brake of the present invention, relative to the rotation direction A the length L1 of the mounting portion 18 (provided on the entrance side with respect to the rotation direction A) of the caliper 14 is greater than the length L2 of the mounting portion 19 (provided on the exit side with respect to the rotation direction A) of the caliper 14 so that the cylinder bore 16A is offset between the mounting portions 18 and 19 toward the exit side with respect to the rotation direction A. Therefore, during braking, the friction pad 29 in contact with the disk 11 does not receive a high surface pressure on the entrance side with respect to the rotation direction A.

Further, in the disk brake of the present invention, relative to the direction of the axis of the disk 11 the thickness of the mounting portion 18 (provided on the entrance side with respect to the rotation direction A) of the caliper 14 is greater than that of the mounting portion 19 (provided on the exit side with respect to the rotation direction A) of the caliper 14 so that, during braking, when the torque from the friction pads 24 and 29 acts on the caliper 14 as a bending moment in the direction indicated by the arrow M in FIG. 1, flexural rigidity of the mounting portion 18 relative to this bending moment is higher than that of the mounting portion 19. Therefore, elastic deformation of the caliper 14 as a whole in the direction M, which occurs due to a difference in flexural rigidity between the mounting portions 18 and 19 in the conventional technique, can be avoided and the axis of the piston 23 (the cylinder bore 16A) can always be maintained substantially in parallel to the axis of the disk 11.

Accordingly, in the disk brake of the present invention, during braking, the friction pads 24 and 29 can be pressed against the disk 11 by means of the piston 23 with a surface pressure being substantially equally distributed on each pad between the entrance side and the exit side with respect to the rotation direction A. Therefore, the friction pads 24 and 29 always apply a stable braking force, thus improving the performance of the disk brake.

Further, non-uniform wearing of the linings 25 and 30 of the friction pads 24 and 29 can be suppressed. This increases the life of the pads and suppresses brake noise during braking, and lowers fuel consumption by preventing dragging when the braking force has been released.

Further, with respect to the arms 12A of the carrier 2, a relatively large gap is formed between the pin hole 13 in the arm 12A provided on the exit side with respect to the rotation direction A (hereinafter, frequently referred to simply as "the exit-side arm 12A") and the distal end portion 21A of the sliding pin 21 as compared to the gap between the pin hole 13 in the arm 12A provided on the entrance side with respect to the rotation direction A (hereinafter, frequently referred to simply as "the entrance-side arm 12A") and the distal end portion 20A of the sliding pin 20. Therefore, during braking, even when the torque from the disk 11 deforms the exit-side arm 12A so that it is inclined relative to the connecting portion 12B as indicated by the dot-and-chain line in FIG. 7, the exit-side arm 12A can be displaced relative to the sliding pin 21 by an amount corresponding to the gap between the pin hole 13 in the exit-side arm 12A and the distal end portion 21A of the sliding pin 21. Therefore, elastic deformation of the caliper 14 in the direction M due to the effect of deformation of the exit-side arm 12A can be suppressed, to thereby prevent inclination of the cylinder bore 16A relative to the disk 11, and a stable braking force can be obtained.

Further, of the arms 12A of the carrier 12, the arm 12A provided on the entrance side with respect to the rotation direction A is disposed above the arm 12A provided on the exit side with respect to the rotation direction A, and the gap between the pin hole 13 in the entrance-side arm 12A and the distal end portion 20A of the sliding pin 20 is made smaller than that between the pin hole 13 in the exit-side arm 12A and the distal end portion 21A of the sliding pin 21. Therefore, in a non-braking state, the sliding pin 20 can be stably held in the pin hole 13 in the entrance-side arm 12A without rattle and the caliper 14 as a whole can be stably supported by means of the sliding pin 21 and the pin hole 13 therefor, while being suspended from the entrance-side arm 12A. Thus, the caliper 14 can be mounted on the carrier 12 in a stable position relative to the carrier 12, so that a satisfactorily large braking force can be applied, thereby improving the performance of the disk brake.

Further, the center of gravity G of the caliper 14 is positioned within the range of the fit length L of the sliding pins 20 and 21 to thereby stabilize the position of the caliper 14, including the cylinder bore 16A in a non-braking state relative to the carrier 12, thus improving the performance of the disk brake.

Further, the outer shim plate 33 is in slidable contact with the inner shim plate 32 fixed to the backing plate 31 of the friction pad 29 and the coefficient of friction between the outer shim plate 33 and the inner shim plate 32 is lower than that between the outer shim plate 33 and the claw portion 17. Therefore, during braking, when the friction pad 29 is forced to rotate in the rotation direction A due to the torque from the disk 11, the inner shim plate 32 slidably moves relative to the outer shim plate 33. Therefore, the torque applied to the claw portion 17 through the friction pad 29 can be reduced, so that inclination of the caliper 14 due to high torque transmitted from the disk 11 to the claw portion 17 can be suppressed, thus further suppressing non-uniform wearing of the friction pad 29.

In the above-mentioned embodiment of the present invention, the pin holes 13 are provided in the arms 12A of the carrier 12 and the sliding pins 20 and 21 to be fitted into the pin holes 13 are provided in the caliper 14. However, in the present invention, the pin holes and the sliding pins may be arranged so that the pin holes are provided in the mounting portions of the caliper and the sliding pins are provided in the arms of the carrier.

Further, in the above-mentioned embodiment, the disk brake is arranged to be applied to vehicles, such as automobiles. However, the disk brake of the present invention may be applied to brake systems for apparatuses other than vehicles.

As has been described above in detail, in the disk brake of the present invention, of the mounting portions provided in the cylinder portion of the caliper on the entrance side and the exit side with respect to the rotation direction of the disk, relative to the rotation direction of the disk the length of the mounting portion on the entrance side is greater than that of the mounting portion on the exit side, and with respect to the direction of the axis of the disk the thickness of the mounting portion on the entrance side is greater than that of the mounting portion on the exit side. Therefore, during braking, even when the caliper receives a load due to the braking torque received by the carrier on the exit side, which load can cause inclination of the caliper relative to the disk, flexural rigidity of the mounting portion on the entrance side relative to the load is higher than that of the mounting portion on the exit side.

By this arrangement, during braking, the axis of the cylinder bore in the caliper can be held in parallel to the axis of the disk. Therefore, the friction pads can be pressed against the disk with a surface pressure being substantially equally distributed on each pad between the entrance side and the exit side. Therefore, the friction pads always apply stable braking force, thereby improving the performance of the disk brake. Further, non-uniform wearing of the friction pads can be suppressed, which increases the life of the friction pads and suppresses brake noise during braking, and lowers fuel consumption by preventing dragging when the braking force has been released.

What is claimed is:
1. A disk brake, comprising:
 a carrier fixedly mounted on a non-rotational portion of a vehicle body;
 a caliper slidably supported relative to the carrier by fitting a sliding pin provided in one of the carrier and the caliper into a guide bore formed in the other of the carrier and the caliper; and
 a first friction member and a second friction member disposed at axially opposite sides of a disk, the first friction member being adapted to press one side of the disk according to a motion of a piston provided in the caliper, the second friction member being adapted to press the second friction member against the other side of the disk according to a sliding motion of the caliper relative to the carrier which occurs when the piston presses the first friction member,
 wherein the caliper comprises:
  a cylinder portion disposed at one side of the disk and having a cylinder bore, the piston being slidably provided in the cylinder bore;
  a bridging portion extending across an outer periphery of the disk along the axis of the disk;
  a claw portion connected to the cylinder portion through the bridging portion and disposed at the other side of the disk to press the second friction member;
  a first mounting portion extending from the cylinder portion toward an entrance side with respect to a rotation direction of the disk; and
  a second mounting portion extending from the cylinder portion toward an exit side with respect to the rotation direction of the disk,
  each of the first and second mounting portions having a distal end portion connected to the carrier through the sliding pin,
  the first and second mounting portions being formed such that, relative to the rotation direction of the disk a length of the first mounting portion is greater than a length of the second mounting portion so that the center of the cylinder bore is offset relative to the disk toward the exit side, and such that, with respect to a direction of the axis of the disk, flexural rigidity of the first mounting portion is higher than flexural rigidity of the second mounting portion.
2. A disk brake according to claim 1, wherein a thickness of the first mounting portion is greater than a thickness of the second mounting portion with respect to the direction of the axis of the disk.

3. A disk brake according to claim 1, wherein said second friction member is provided with an inner shim plate fixed thereto on the side remote from said disk and an outer shim plate slidably provided on said inner shim plate and wherein a coefficient of friction between the outer shim plate and said inner shim plate is lower than that between the outer shim plate and the claw portion.

4. A disk brake for braking a disk, comprising:

a carrier to be fixedly mounted;

a caliper slidably supported relative to said carrier, said caliper comprising a cylinder portion to be disposed on one side of the disk and having a cylinder bore and a piston slidable in said cylinder bore, a bridging portion to extend across an outer periphery of the disk along the axis of the disk, a claw portion connected to said cylinder portion by said bridging portion to be disposed at the other side of the disk, a first mounting portion extending from said cylinder portion toward an entrance side of said caliper with respect to a rotation direction of the disk, and a second mounting portion extending from said cylinder portion toward an exit side of said caliper with respect to the rotation direction of the disk; and a first friction member and a second friction member to be disposed at axially opposite sides of the disk and positioned so that said first friction member can be moved by said piston and said second friction member can be pressed by said claw portion;

wherein said first mounting portion is slidably connected to said carrier by a first sliding pin fitted in a first guide bore, and said second mounting portion is slidably connected to said carrier by a second sliding pin in a second guide bore;

wherein said first mounting portion has a length in the direction of rotation of the disk greater than a length of said second mounting portion in the direction of rotation of the disk so that the center of said cylinder bore is offset toward the exit side of said caliper with respect to the direction of rotation of the disk; and wherein said first mounting portion has a greater flexural rigidity with respect to a direction of the axis of the disk than said second mounting portion.

5. The disk brake of claim 4, wherein said first mounting portion has a greater thickness than said second mounting portion with respect to the direction of the axis of the disk.

6. The disk brake of claim 4, wherein said second friction member has an inner shim plate fixed thereto on a side thereof so as to be remote from the disk and an outer shim plate provided to be slidable on said inner shim plate, a coefficient of friction between said outer shim plate and said inner shim plate being lower than that between said outer shim plate and said claw portion.

7. A disk brake for braking a disk, comprising:

a carrier to be fixedly mounted;

a caliper slidably supported relative to said carrier, said caliper comprising a cylinder portion to be disposed on one side of the disk and having a cylinder bore and a piston slidable in said cylinder bore, a bridging portion to extend across an outer periphery of the disk along the axis of the disk, a claw portion connected to said cylinder portion by said bridging portion to be disposed at the other side of the disk, a first mounting portion extending from said cylinder portion toward an entrance side of said caliper with respect to a rotation direction of the disk, and a second mounting portion extending from said cylinder portion toward an exit side of said caliper with respect to the rotation direction of the disk; and a first friction member and a second friction member to be disposed at axially opposite sides of the disk and positioned so that said first friction member can be moved by said piston and said second friction member can be pressed by said claw portion;

wherein said first mounting portion is slidably connected to said carrier by a first sliding pin fitted in a first guide bore, and said second mounting portion is slidably connected to said carrier by a second sliding pin in a second guide bore;

wherein the center of said cylinder bore is offset toward the exit side of said caliper from the center point between said first mounting portion and said second mounting portion with respect to the direction of rotation of the disk; and wherein said first mounting portion has a greater flexural rigidity with respect to a direction of the axis of the disk than said second mounting portion.

8. The disk brake of claim 7, wherein said first mounting portion has a greater thickness than said second mounting portion with respect to the direction of the axis of the disk.

9. The disk brake of claim 7, wherein said second friction member has an inner shim plate fixed thereto on a side thereof so as to be remote from the disk and an outer shim plate provided to be slidable on said inner shim plate, a coefficient of friction between said outer shim plate and said inner shim plate being lower than that between said outer shim plate and said claw portion.

10. The disk brake of claim 7, wherein said first sliding pin and said second sliding pin are connected to said first and second mounting portions, respectively, and said first guide bore and said second guide bore are formed in said carrier.

* * * * *

UNITED STATES PATENT AND TRADEMARK OFFICE
CERTIFICATE OF CORRECTION

PATENT NO.    : 6,247,561 B1
DATED         : June 19, 2001
INVENTOR(S)   : Kazuhiro Doi et al.

It is certified that error appears in the above-identified patent and that said Letters Patent is hereby corrected as shown below:

<u>Title page,</u>
Item [73], change "Tokico, Ltd., Kanagawa-ken (JP)" to -- Tokico, Ltd., Kanagawa-ken (JP) and Nissan Motor Co., Ltd., Kanagawa-ken (JP) --.

Signed and Sealed this

Twenty-fifth Day of June, 2002

*Attest:*

JAMES E. ROGAN
*Attesting Officer*            *Director of the United States Patent and Trademark Office*